US008885463B1

(12) United States Patent
Medved et al.

(10) Patent No.: US 8,885,463 B1
(45) Date of Patent: Nov. 11, 2014

(54) PATH COMPUTATION ELEMENT COMMUNICATION PROTOCOL (PCEP) EXTENSIONS FOR STATEFUL LABEL SWITCHED PATH MANAGEMENT

(75) Inventors: Jan Medved, Pleasanton, CA (US); David Ward, Los Gatos, CA (US); Robert Varga, Bratislava (SK)

(73) Assignee: Juniper Networks, Inc., Sunnyvale, CA (US)

( * ) Notice: Subject to any disclaimer, the term of this patent is extended or adjusted under 35 U.S.C. 154(b) by 195 days.

(21) Appl. No.: 13/324,861

(22) Filed: Dec. 13, 2011

Related U.S. Application Data

(60) Provisional application No. 61/548,088, filed on Oct. 17, 2011.

(51) Int. Cl.
  *H04L 12/28* (2006.01)
(52) U.S. Cl.
  USPC ............ 370/228; 370/255; 370/390; 709/224
(58) Field of Classification Search
  CPC ............................... H04L 45/50; H04L 45/00
  USPC ................. 370/255, 228, 390, 235, 238, 328; 709/224
  See application file for complete search history.

(56) References Cited

U.S. PATENT DOCUMENTS

| | | | |
|---|---|---|---|
| 8,422,360 B2 | 4/2013 | Shimizu et al. | |
| 8,483,123 B2 | 7/2013 | Zheng et al. | |
| 2003/0103510 A1 | 6/2003 | Svanberg et al. | |
| 2005/0169313 A1 | 8/2005 | Okamura et al. | |
| 2007/0165515 A1 | 7/2007 | Vasseur | |
| 2008/0037562 A1 | 2/2008 | Saleh et al. | |
| 2009/0122718 A1 | 5/2009 | Klessig et al. | |
| 2011/0044352 A1 | 2/2011 | Chaitou et al. | |
| 2011/0047262 A1 | 2/2011 | Martin et al. | |
| 2011/0078230 A1 | 3/2011 | Sepulveda | |
| 2011/0110226 A1* | 5/2011 | Lu et al. .................. | 370/228 |
| 2011/0110368 A1 | 5/2011 | Matsumoto | |
| 2011/0202651 A1 | 8/2011 | Hilt et al. | |
| 2012/0092986 A1* | 4/2012 | Chen ........................ | 370/228 |
| 2012/0158938 A1 | 6/2012 | Shimonishi et al. | |
| 2013/0007266 A1* | 1/2013 | Jocha et al. ............. | 709/224 |

OTHER PUBLICATIONS

Crabbe et al., "PCEP Extensions for Stateful PCE," Network Working Group Internet Draft, draft-crabbe-pce-stateful-pce-00, Oct. 16, 2011, 40 pp.

(Continued)

*Primary Examiner* — Jeffrey M Rutkowski
*Assistant Examiner* — Romani Ohri
(74) *Attorney, Agent, or Firm* — Shumaker & Sieffert, P.A.

(57) ABSTRACT

In general, techniques are described for extending a path computation element (PCE) communication protocol (PCEP) to support messages that enable PCEs to actively modify Multi-Protocol Label Switching (MPLS) for Traffic Engineering Label Switched Paths (TE LSPs) in and across network domains. In one example, an LSP database of a router includes configuration data for one or more LSPs configured in the router and further includes LSP state information specifying a current state of all LSPs of the router. A path computation client (PCC) of a router establishes an extended PCEP session and synchronizes LSP state information to a stateful PCE using the extended PCEP session. Subsequently, the stateful PCE sends an LSP update request to the PCC in the extended PCEP session, wherein the LSP update request includes one or more updated parameters for the LSP. The PCC then re-signals the LSP through the network according to the updated parameters.

37 Claims, 9 Drawing Sheets

(56) References Cited

OTHER PUBLICATIONS

Farrel et al., "A Path Computation Element (PCE)-Based Architecture," RFC 4655, Aug. 2006, 41 pp.
Ash et al., "Path Computation Element (PCE) Communication Protocol Generic Requirements," RFC 4657, Sep. 2006, 22 pp.
Vasseur et al., "Path Computation Element (PCE) Communication Protocol (PCEP)," RFC 5440, Mar. 2009, 88 pp.
Lee et al., "Path Computation Element Communication Protocol (PCEP) Requirements and Protocol Extensions in Support of Global Concurrent Optimization," RFC 5557, Jul. 2009, 27 pp.
U.S. Appl. No. 13/110,987, by Jan Medved, filed May 19, 2011.
U.S. Appl. No. 12/182,619, by Jerome P. Moisand, filed Jul. 30, 2008.
Sahni et al., "Bandwidth Scheduling and Path Computation Algorithms for Connection-Oriented Networks," Sixth International Conference on Networking, Apr. 22-28, 2007, 16 pp.
OpenFlow Switch Specification, Version 1.1.0, Openflow Consortium, Feb. 28, 2011, found at http://www.openflow.org/documents/openflow-spec-v1.1.0.pdf, 56 pp.
McKeown et al., "OpenFlow: Enabling Innovation in Campus Networks," Whitepaper from Stanford University, Mar. 14, 2008, 6 pp.
Seedorf et al., "Application-Layer Traffic Optimization (ALTO) Problem Statement," RFC 5693, Oct. 2009, 15 pp.
Alimi et al., "ALTO Protocol," draft-ietf-alto-protocol-06.txt, ALTO WG Internet-Draft, Oct. 25, 2010, 66 pp.
U.S. Appl. No. 12/861,645, by Jan Medved, filed Aug. 23, 2010.
U.S. Appl. No. 12/861,681, by Satish Raghunath, filed Aug. 23, 2010.
Bryant et al., "Pseudo Wire Emulation Edge-to-Edge (PWE3) Architecture," RFC 3985, Mar. 2005, 40 pp.
Miyazawa et al., "Traffic Engineering Database Management Information Base in support of MPLS-TE/GMPLS," Internet Draft, draft-ietf-ccamp-gmpls-ted-mib-09.txt, Jul. 11, 2011, 33 pp.
Oki et al., "Framework for PCE-Based Inter-Layer MPLS and GMPLS Traffic Engineering," RFC 5623, Sep. 2009, 35 pp.
Bryskin et al., Policy-Enabled Path Computation Framework, RFC 5394, Dec. 2008, 37 pp.
Chamania et al., "Lessons Learned From Implementing a Path Computation Element (PCE) Emulator," Optical Fiber Communication and Exposition, Mar. 6-10, 2011, 3 pp.
U.S. Appl. No. 13/339,983, by Jan Medved, filed Dec. 29, 2011.
U.S. Appl. No. 13/340,191, by Jan Medved, filed Dec. 29, 2011.

\* cited by examiner

PATH COMPUTATION ELEMENT COMMUNICATION PROTOCOL (PCEP) EXTENSIONS FOR STATEFUL LABEL SWITCHED PATH MANAGEMENT

PRIORITY CLAIM

This application claims the benefit of U.S. Provisional Application No. 61/548,088, filed Oct. 17, 2011, the entire content of which is incorporated herein by reference.

TECHNICAL FIELD

The invention relates to computer networking and, more specifically, to providing traffic engineering within a network.

BACKGROUND

Routing devices within a network, often referred to as routers, maintain tables of routing information that describe available routes through the network. Network routers maintain routing information that describes available routes through the network. Upon receiving a packet, a router examines information within the packet and forwards the packet in accordance with the routing information. In order to maintain an accurate representation of the network, routers exchange routing information in accordance with one or more routing protocols, such as an interior gateway protocol (IGP) or Border Gateway Protocol (BGP).

The term "link" is often used to refer to the connection between two devices on a network. The link may be a physical connection such as a copper wire, a coaxial cable, any of a host of different fiber optic lines or a wireless connection. In addition, network devices may define "virtual" or "logical" links, and map the virtual links to the physical links. In other words, the use of virtual links provides a degree of abstraction.

Traffic engineering may be applied within a network for a variety of purposes, such as to route traffic around network failures or congested links or to direct certain traffic along a particular path through the network that meets a set of explicit requirements. For example, a router within the network may establish a label switched path (LSP) in a Multi-Protocol Label Switching (MPLS) network using a resource reservation protocol, such as the Resource Reservation Protocol with Traffic Engineering extensions (RSVP-TE). Once a packet is mapped on to an LSP by a label edge router (LER), the intermediate devices along the LSP forward the packet based on labels attached to the packet, rather than making independent forwarding decisions based on the packet destination and the intermediate devices' routing information. A Traffic Engineering MPLS LSP (TE LSP) may in this way be used to define and implement a path from a source device to a destination device that satisfies requirements for certain traffic transported by the network.

The explicit requirements that must be satisfied by an LSP represent constraints upon the set of possible paths from the source device to the destination device. These constraints, such as available bandwidth, direct shortest path first algorithms to compute a satisfactory path with regard to the constraint metrics. The network routers then establish an LSP that matches the computed path and, using the LSP, forward traffic in a manner that satisfies the constraints. Constrained shortest path first (CSPF) thus represents a fundamental building block for traffic engineering systems, including MPLS and Generalized MPLS (GMPLS) networks. However, constraint-based path computation in large, multi-domain, multi-region, and/or multi-layer networks is complex and may in some instances require cooperation between elements in different administrative domains that do not exchange sufficient traffic engineering information for computing multi-domain paths.

Network operators may augment the functionality of their networks by introducing one or more path computation elements (PCEs) that allow the network routers to offload path computation. A PCE establishes PCE communication protocol (PCEP) sessions with one or more path computation clients (PCCs) through a network. Path computation clients, such as routers, issue path computation requests to the PCE using their respective PCEP sessions. The PCE applies constraints provided in a path computation request to compute the path of a TE LSP through a path computation domain that satisfies the constraints. The PCE then returns the path to the requesting PCC, effectively augmenting the network path computation functionality. A PCE may be stateless or stateful. In general, a stateless PCE does not maintain state describing TE LSPs in the network. A stateful PCE, on the other hand, maintains state for a subset of TE LSPs in the network, allowing the stateful PCE to utilize more sophisticated LSP path computation algorithms in some instances.

SUMMARY

In general, techniques are described for extending a path computation element (PCE) communication protocol (PCEP) to support messages that enable PCEs to actively modify Multi-Protocol Label Switching (MPLS) for Traffic Engineering Label Switched Paths (TE LSPs) in and across network domains. The PCEP extensions include protocol messages that enable PCEs to receive LSP state information from path computation clients (PCCs) such as network routers, assume control of specified LSPs via delegation from the PCCs, control the sequence of path computations within and across PCEP sessions, and inject LSP state into network routers to direct the timing of LSP state modifications, including modification to LSP status (e.g., 'up' or 'down').

By enabling PCC-specific LSP state information synchronization with the PCE, the techniques may provide continually-updated and network-wide visibility on the part of the PCE of per-LSP state information and per-device resource availability. This enhanced visibility when combined with further extensions to PCEP may enable the PCE to improve resource demand placement among multiple LSPs, headed by multiple different routers, over that provided by multiple LSP head-end routers computing paths and signaling LSPs independently. In addition, the delegation and control techniques may allow the PCE to trigger LSP re-signaling, by an LSP head-end router, in order to improve LSP placement. LSP state injection using the PCEP extensions described herein may further enable to the PCE to modify LSP parameters, including bandwidth and state, to synchronously coordinate demand placement, thereby permitting ordered control of path reservations across network routers.

In one embodiment, a method comprises establishing an extended path computation element communication protocol (PCEP) session with a stateful path computation element (PCE) to a path computation client (PCC) of a network router of a packet-switched network. The method also comprises receiving, with the stateful PCE, label switched path (LSP) state information that specifies a current state of an LSP of the PCC. The method also comprises sending an LSP update request from the stateful PCE to the PCC, wherein the LSP update request includes one or more updated parameters for the LSP.

In another embodiment, a path computation element (PCE) comprises a control unit having one or more processors. A client interface of the control unit establishes an extended path computation element communication protocol (PCEP) session to a path computation client (PCC) of a network router of a packet-switched network. The PCE also comprises a label switched path (LSP) state database that stores LSP state information for one or more LSPs owned by the PCC, wherein the client interface receives LSP state information that specifies a current state of an LSP of the PCC and stores the LSP state information to the LSP state database, wherein the client interfaces sends an LSP update request to the PCC, and wherein the LSP update request includes one or more updated parameters for the LSP.

In another embodiment, a method comprises establishing an extended path computation element communication protocol (PCEP) session, with a path computation client (PCC) of a network router of a packet-switched network, to a stateful path computation element (PCE). The method also comprises synchronizing, with the PCC, label switched path (LSP) state information that specifies a current state of an LSP of the PCC to the stateful PCE using the extended PCEP session. The method also comprises receiving, with the PCC, an LSP update request from the stateful PCE, wherein the LSP update request includes one or more updated parameters for the LSP.

In another embodiment, a router comprises a control unit having one or more processors. A path computation client of the control unit has a path computation element (PCE) interface that establishes an extended path computation element communication protocol (PCEP) session to a stateful PCE. The router also comprises a label switched path (LSP) database that includes configuration data for one or more LSPs configured in the router and further includes LSP state information specifying a current state of all LSPs of the router, wherein the PCE interface synchronizes the LSP state information to the stateful PCE using the extended PCEP session, wherein the PCE interface receives an LSP update request from the stateful PCE, and wherein the LSP update request includes one or more updated parameters for one of the LSPs.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

Like reference characters denote like elements throughout the figures and text.

DETAILED DESCRIPTION

Figure 1:
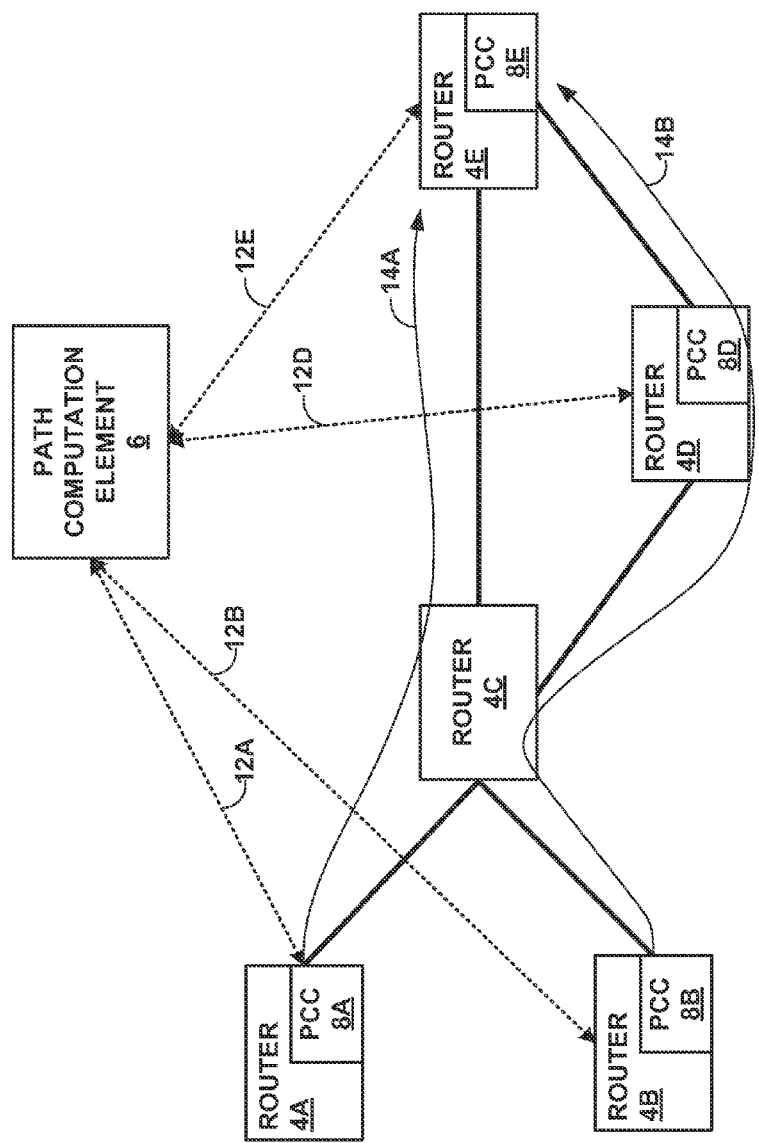
FIG. 1 is a block diagram illustrating a network system in which a path computation element (PCE) uses extended PCE communication protocol (PCEP) sessions in accordance with techniques of this disclosure to control label switched paths (LSPs) connecting routers having path computation clients (PCCs).

FIG. 1 is a block diagram illustrating a network system in which a path computation element (PCE) uses extended PCE communication protocol (PCEP) sessions in accordance with techniques of this disclosure to control label switched paths (LSPs) connecting routers having path computation clients (PCCs). In this example, network system 2 includes PCE 6 and a plurality of routers 4A-4E ("routers 4") interconnected in the illustrated topology by network links. Routers 4 are members of a path computation domain served by PCE 6. The path computation domain may include, for example, an Interior Gateway Protocol (e.g., Open Shortest Path First (OSPF) or Intermediate System-to-Intermediate System (IS-IS)) area, an Autonomous System (AS), multiple ASes within a service provider network, multiple ASes that span multiple service provider networks. In various examples, different combinations of routers 4 may include member routers of multiple ASes. As such, network links connecting routers 4 may be interior links, inter-AS transport links, or some combination thereof. While illustrated and described with respect to routers, the techniques may be applicable to any network device that requests path computation and implements Multi-Protocol Label Switching (MPLS) or Generalized MPLS (GMPLS).

PCE 6 uses traffic engineering and LSP state information learned from routers 4 to apply constraints to compute network paths for MPLS traffic engineering LSPs (TE LSPs) both in response to requests from any of routers 4 and autonomously. PCE 6 is an application or other process executing on, for instance, a network node such as one of routers 4, a component of a network node, or an in-network or out-of-network server. To obtain traffic engineering information for storage in a traffic engineering database (not shown in FIG. 1), PCE 6 may execute one or more network routing protocols, extended to carry traffic engineering information, to listen for routing protocol advertisements that carry such traffic engineering information. PCE 6 computes paths for TE LSPs by applying bandwidth and other constraints to learned traffic engineering information. A resulting path may be confined to a single domain or may cross several domains.

Each of routers 4, other than router 4C, includes one of path computation clients 8A-8E ("PCCs 8") that communicates using a corresponding one of extended PCE communication protocol (PCEP) sessions 12A-12E. Reference herein to a PCC may additionally refer to router or other network device that includes the PCC. Each of PCCs 8 is an application or other process executed by the router that establishes an extended PCEP session 12 with which to request path computation from PCE 6. An extended PCEP session 12 may operate over Transport Control Protocol (TCP) using a well-known port. Router 4C is a core router and is not, in this example, a label edge router (LER) that establishes LSPs and therefore does not include a path computation client. Instead, router 4C is a label switching router (LSR).

Conventional PCEP provides a mechanism for PCCs 8 to issue to PCE 6 a path computation request for one or more TE LSPs. In other words, a PCE executing conventional PCEP operates in a request/reply mode, where PCCs requests a computation and the PCE replies with a result. For each requested TE LSP, the path computation request may include a required bandwidth, a setup/holding priority, the source and destination network addresses, and a request priority. PCE 6 replies with a computed path for a requested TE LSP when the PCE 6 determines a path using the learned traffic information that satisfies the constraints. Upon receiving a response from PCE 6, routers 4 use a resource reservation protocol, such as Resource Reservation Protocol with Traffic Engineering extensions (RSVP-TE), to reserve resources along a computed path and establish TE LSPs to carry traffic mapped to the LSPs. Additional details regarding conventional PCEP may be found in "Path Computation Element (PCE) Communication Protocol (PCEP)," Network Working Group, Request for Comment 5440, March 2009, the entire contents of which being incorporated by reference herein. Additional information on RSVP-TE may be found in "RSVP-TE: Extensions to RSVP for LSP Tunnels", Network Working Group, Request for Comment 3209, December 2001, which is incorporated herein by reference in its entirety.

In the illustrated example network system 2, PCC 8A receives from PCE 6 a computed path that causes router 4A to use RSVP-TE to head and establish TE LSP 14A that traverses label switching router (LSR) 4C to tail-end label edge router (LER) 4E. Similarly, PCC 8B receives from PCE 6 a computed path that causes router 4B to use RSVP-TE to head and establish TE LSP 14B that traverses LSRs 4C and 4D to tail-end LER 4E. Only two TE LSPs are shown for ease of illustration. In various examples, network system 2 may include any number of TE LSPs connecting different pairs of routers 4. In addition, TE LSPs may recursively include other TE LSPs as virtual links. For example, TE LSP 14B may include, as a virtual link, a TE LSP (not shown) that tunnels labeled traffic from router 4C to router 4D.

Extended PCEP sessions 12 support additional functionality (i.e., beyond that provided by conventional PCEP) to allow PCC 8 to synchronize LSP state information with PCE 6, delegate control over LSPs to PCE 6, and receive LSP modification requests from PCE 6 for delegated LSPs. This additional functionality provided by extended PCEP sessions 12 facilitates a stateful PCE 6 that maintains synchronization not only between PCE 6 and network system 2 topology and resource information, but also between PCE 6 and the set of computed paths and reserved resources in use in the network, as provided by PCCs 8 in the form of LSP state information. Not all of routers 4 need support the described techniques, and each router 4 may advertise to PCE 6 whether it supports the extended functionality described herein.

The synchronized LSP state information learned from PCCs 8 allows PCE 6 to optimize path computations. That is, PCC 8-specific LSP state information synchronization with PCE 6 may provide continually-updated and network-wide visibility on the part of PCE 6 of per-LSP state information and per-router 4 resource availability. This enhanced visibility may enable PCE 6 to improve resource demand placement among TE LSPs 14 headed by respective routers 4A, 4B, over that would otherwise be provided by routers 4A, 4B, computing paths and signaling TE LSPs 14 independently.

In some instances, the extended PCEP sessions 12 also allow PCE 6 to actively update LSP parameters in those PCCs 8 that have delegated control to PCE 6 over one or more LSPs headed by corresponding routers 4. The delegation and control techniques may, for example, allow PCE 6 to trigger LSP re-route, by an LSP head-end router such as any of routers 4, in order to improve LSP placement. In addition, LSP state injection using extended PCEP sessions 12 may further enable to PCE 6 to modify parameters of TE LSPs 14, including bandwidth and state, to synchronously coordinate demand placement, thereby permitting ordered control of path reservations across network routers.

Following a path computation or optimization/recomputation by PCE 6 using synchronized LSP state information and traffic engineering information, it is not enough to know the paths of multiple new LSPs. The sequence of RSVP reservation message (e.g., "RESV" message) arrival at various routers 4 is based on the asynchronous actions of the head-end routers for the LSPs being set up. As a result, reconfiguration of routers 4 does not happen simultaneously. The order in which head-end routers establish LSPs 14 may have a significant affect on total throughput of network system 2. In addition, an old reservation setup from router 4A that is to be torn down may yet be active and take up the bandwidth on links that should be used by a new reservation from router 4B, for instance. LSP state visibility enabled by extended PCEP sessions 12 allows PCE 6 to control the order in which LSPs 14 are brought up for use in forwarding labeled traffic in order to improve total throughput. Because stateful PCE 6 operating according to the techniques of this disclosure has global demands visibility and the ability to systemically coordination demand placement, PCE 6 may decouple overall network system 2 usage efficiency from the order in which the LSPs are set up.

In this way, the techniques may overcome limitations inherent in conventional network optimization techniques, such limitations including sequential rather than concurrent optimization of multiple TE LSPs, an inability to specify the optimization sequence, an inability to consider ways in which modification of one TE LSP and signaling LER will affect other TE LSPs/LERs, and lack of scope for shuffling TE LSPs to increase the number of TE LSPs that may be programmed into the network. Receiving LSP state information for and being delegated control over a plurality of LSPs 14, by contrast, may allow PCE 6 to perform bulk reoptimization of LSPs 14 in an optimization sequence determined by PCE 6. Further, LSP state information previously received may enable PCE 6 to consider the effect of optimizations to LSP 14A on LSP 14B, for example, and to shuffle LSPs 14 (and any other LSPs) to increase the number of LSPs that may be programmed into routers 4. The techniques may therefore allow PCE 6 to apply a consistent optimization method able to produce predictable results to within either the boundary of forecast error (when reservations are over-provisioned by reasonable margins) or to the variability of the signal and the forecast error.

Figure 2:
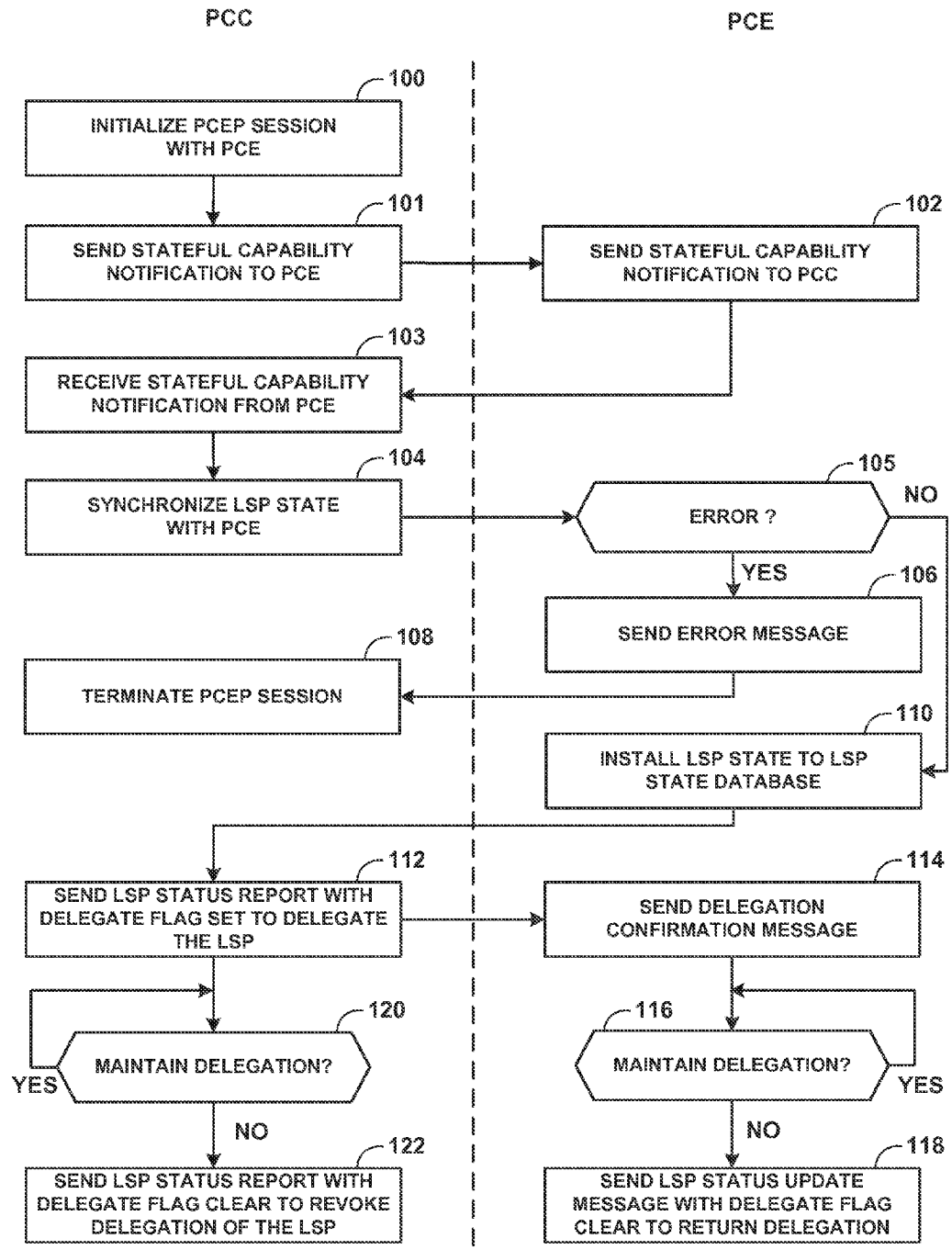
FIG. 2 is a flowchart illustrating example modes of operation for a PCC and a PCE using extended PCEP session techniques of this disclosure.

FIG. 2 is a flowchart illustrating example modes of operation for a PCC and a PCE using extended PCEP session techniques of this disclosure. PCC 8A of router 4A, in this example, initializes PCEP session 12A with PCE 6 (100). Initialization includes, specifically, establishing PCEP session 12A to PCE 6 and negotiating with PCE 6 the use of stateful PCEP extensions by exchanging with PCE 6 a stateful capability notification. The stateful capability notification may include a "Stateful Capability" Type-Length-Value object (TLV) included in a PCEP message, such as the OPEN object of a PCEP Open Message. An example of stateful capability TLV is described below more fully with respect to FIG. 9. When PCC 8A is configured to synchronize LSP state information, as in this example, PCC 8A sends a stateful capability notification to PCE 6 (101). Likewise, when PCE 6 is a stateful PCE, as in this example, PCE 6 signals its willingness to receive LSP state information from PCC 8A by sending PCC 8A a stateful capability notification (102). PCC 8A receives the stateful capability notification from PCE 6 (103), which causes PCC 8A to perform LSP state synchronization (104). LSP state synchronization may be performed immediately after initialization.

PCCs 8 synchronize PCE 6 using PCEPs 12 to provide a "checkpoint" in time replica of LSP state information for the respective PCCs in PCE 6. To provide PCE 6 with full visibility into the LSP state of network system 2, PCCs 8 may avoid sending a path computation request to PCE 6 prior to completing their own synchronization process. PCC 8A may synchronize LSP state information with PCE 6 by issuing a path computation report ("PCRpt") message for each of its managed LSPs. Examples of PCRpt messages are described more fully with respect to FIG. 5, below. If either PCC 8A or PCE 6 experience an error during LSP state synchronization, the entity sends a path computation error ("PCErr") message to its counterpart in PCEP session 12A, which terminates the session. In the illustrated example, PCE 6 determines whether an error occurs during LSP state synchronization (105). Upon detecting an error (YES branch of 105), PCE 6 sends a PCErr message to PCC 8A via PCEP session 12A (106), which causes PCC 8A and PCE 6 to terminate PCEP session 12A (108).

When LSP state synchronization is successful (NO branch of 105), PCE 6 installs the LSP state information to its LSP state database, which includes LSP state information receives from any of PCCs 8 that perform synchronization with PCE 6 (110). Despite storing LSP state information with PCE 6, LSPs' state ownership remains with the PCCs 8 for the respective routers 4 configured with the LSPs. As a result, while PCC 8A may receive LSP parameter values for delegated LSPs from PCE 6, PCC 8A ultimately controls when and how to apply received parameters and set up the LSP. In other words, while active stateful PCE 6 may be delegated control over a LSPs of PCC 8A using extended PCEP session 12A, the delegated LSPs' state ownership is retained by PCC 8A. PCE 6 may however specify values for a subset of any delegated LSPs parameters as well as determine LSP modification timing, as described in further detail below. In general, PCC 8A retaining LSP state ownership allows the PCC to interact with both stateless PCEs using conventional PCEP as well as stateful PCEs using extended PCEP during the PCC's operation. In addition, PCC 8A may maintain control over some of the LSP's parameters and allow such parameters to be set by a network operator, while others of the LSP's parameters may be specified by PCE 6. PCC 8A may also, at any time, revert a delegated LSP to an operator-defined default or delegate the LSP to a different PCE should PCEP session 12A be terminated or PCC 8A otherwise become disconnected from PCE 6 that has been delegated the LSP. As a result, PCC 8A may maintain uninterrupted operations of its owned LSPs in the event PCE 6 fails or while PCC 8A transfers control of the LSPs to another PCE, for instance.

Each of PCRpt messages from PCC 8A reporting the status of LSPs to PCE 6 may also include a delegate flag that specifies whether PCC 8A delegates a temporary right to PCE 6 to update a subset of parameters for the corresponding LSP. PCRpt messages delegating control may be sent after initialization, such as during LSP state synchronization or during an update of LSP state information any time thereafter. In the example mode of operation illustrated in FIG. 2, PCC 8A sends to PCE 6 an LSP state report in a PCRpt message that includes a set delegate flag (112). PCE 6 responds with a delegation confirmation message (114), which may be included in a path computation update ("PCUpd") message, examples of which are described in further detail with respect to FIG. 8.

A previous delegation for an LSP may be revoked by PCC 8A at any time during PCEP session 12A. If PCC 8A decides not to maintain a delegation (NO branch of 120), PCC 8A may send a LSP state report in a PCRpt message that includes a cleared delegate flag to revoke the delegation (122). As a result, PCE 6 may no longer update the LSP parameters. In some instances, any LSP parameters provided by PCE 6 may be removed by PCC 8A following a revocation and expiry of a configurable delegation timeout interval.

A delegation from PCC 8A previously accepted by PCE 6 may be returned at any time during PCEP session 12A as well. If PCE 6 decides not to maintain a delegation (NO branch of 116), PCE 6 may send a PCUpd message that includes a cleared delegate flag to return the delegation (122). As a result, PCE 6 may no longer update the LSP parameters. In some instances, any LSP parameters provided by PCE 6 may be removed by PCC 8A following the delegation return and expiry of the delegation timeout interval. Delegation and revocation may be performed on a per-LSP basis.

In some case, a PCE may not have any delegated LSPs. For example, in a redundant configuration where one PCE is backing up another PCE, the backup PCE will not have any delegated LSPs. Although the backup PCE does not update any LSPs, it nevertheless receives all LSP state reports from PCCs. When the primary PCE fails, a PCC will delegate to the backup PCE all LSPs that had been previously delegated to the failed PCE in order to restore active, stateful PCE operations for the network.

Figure 3:
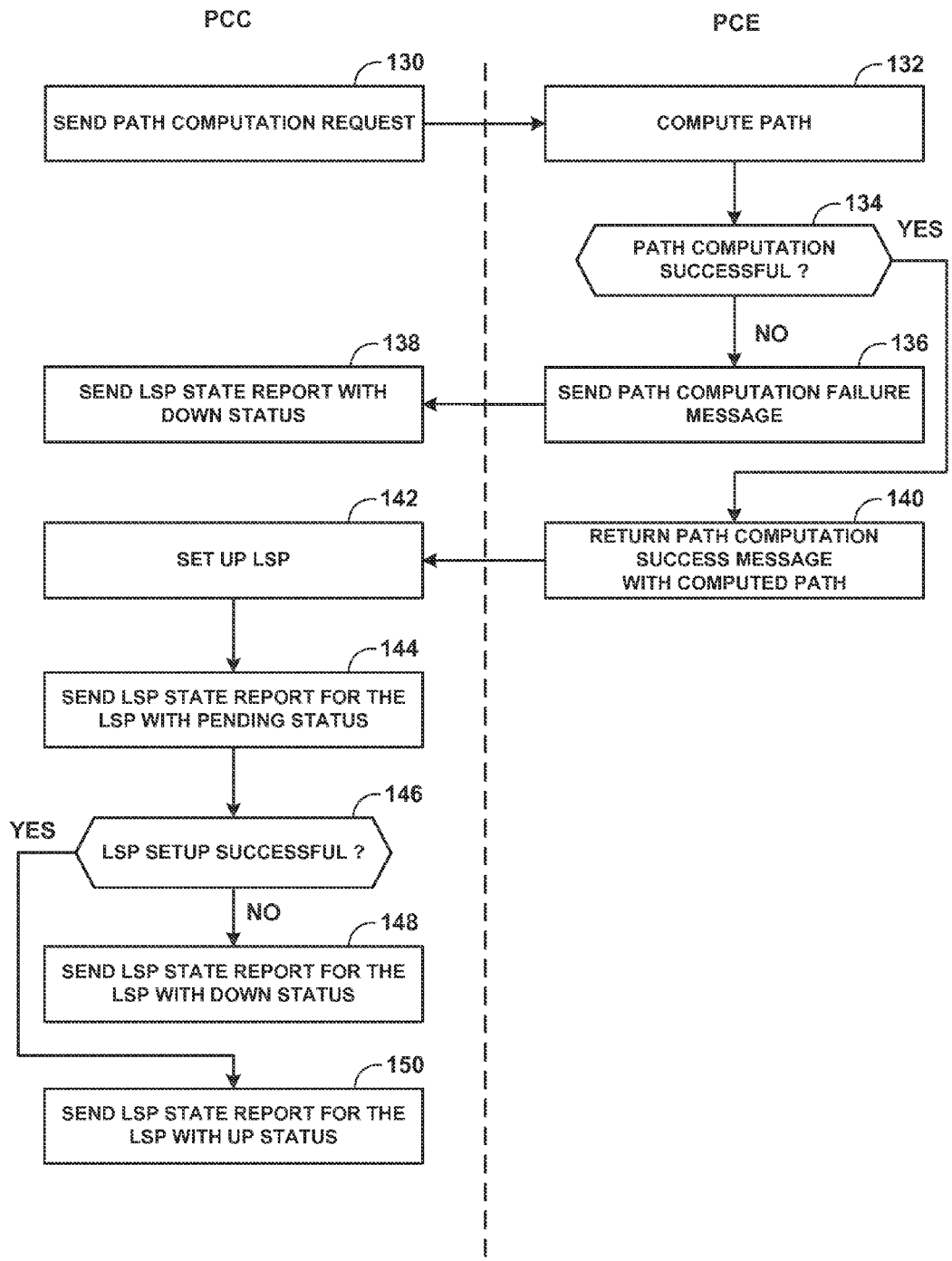
FIG. 3 is a flowchart illustrating example modes of operation for a PCC and a PCE using extended PCEP session techniques of this disclosure to facilitate continuous LSP state synchronization with the PCE.

FIG. 3 is a flowchart illustrating example modes of operation for a PCC and a PCE using extended PCEP session techniques of this disclosure to facilitate continuous LSP state synchronization with the PCE. PCE 6 operating according to the described techniques may be a passive stateful or an active stateful PCE. A passive stateful instance of PCE 6 uses LSP state information learned from PCCs 8 to optimize path computations. An active stateful instance of PCE 6 may perform the functionality of a passive stateful PCE and additionally autonomously update LSP parameters for any LSPs delegated by PCCs 8 to PCE 6. While PCCs 8 may send PCE 6 a path computation request, PCCs 8 do not send PCE 6 path computation requests for LSPs already delegated to an active stateful PCE. PCCs 8 maintain synchronization with both passive stateful and active stateful PCEs using corresponding extended PCEP sessions 12.

In the illustrated example, PCC 8A, having established extended PCEP session 12A and performed state synchronization with PCE 6, sends a path computation request ("PCReq") message that includes the request parameters (RP) and END-POINTS objects (130). The RP object specifies various characteristics of the path computation request, such as request priority, whether the PCReq message relates to reoptimization, whether a loose path composed of at least one loose next hop is acceptable, and whether the path computation request relates to a bi-directional LSP having similar traffic engineering requirements in each direction. The END-POINTS object specifies the source address and destination address of the path for which a path computation is requested. Addresses may be Internet Protocol (IP) version 4 (IPv4) or IP version 6 (IPv6) network addresses, for example.

PCE 6 applies any constraints received in the path computation request to traffic engineering information in its traffic engineering database to attempt to identify a satisfactory path through network system 2 for an existing LSP configured on router 4A (132). A path computation request may in some instances be a request for a new LSP. If PCE 6 is unable to determine a satisfactory path (NO branch of 134), PCE 6 sends to PCC 8A a path computation failure message (136). The path computation failure message may be a path computation reply ("PCRep") message that includes a NO-PATH object described in RFC 5440. The NO-PATH object may specify reasons for the path computation failure. PCC 8A, unable to route the LSP because a satisfactory path does not exist, sends to PCE 6 an LSP state report that specifies a "down" status for the existing LSP for which PCC 8A requested path computation (138).

If PCE 6 successfully computes a path (YES branch of 134), PCE sends to PCC 8A a path computation success message that specifies the computed path (140). The path computation success message which may be a positive PCRpt message that includes an Explicit Route Object (ERO) that encodes the path of a TE LSP through the network, as described in RFC 5440. PCC 8A attempts to set up the LSP using the computed path received from PCE 6 and RSVP-TE, for example (142). To indicate that LSP setup is proceeding, PCC 8A sends an LSP state report that specifies a "pending" status for the LSP (144).

If the LSP setup is not successful due, for example, to insufficient resources in one of the label switching routers 4 along the computed path (NO branch of 146), PCC 8A sends to PCE 6 an LSP state report that specifies a "down" status for the LSP (148). The LSP state report may state the cause of the failed LSP setup. If the LSP setup is successful (YES branch of 146), PCC 8A sends to PCE 6 an LSP state report that specifies an "up" status for the LSP (150). PCC 8A may therefore send multiple LSP state reports responsive to a single PCRpt from PCE 6. In this way, PCC 8A continually provides any state changes to PCE 6 using LSP state reports to improve the visibility of PCE 6 for computation paths through network system 2. Furthermore, in some embodiments, PCC 8A sends any LSP state report to any PCE with which the PCC has established an extended PCEP session.

Figure 4:
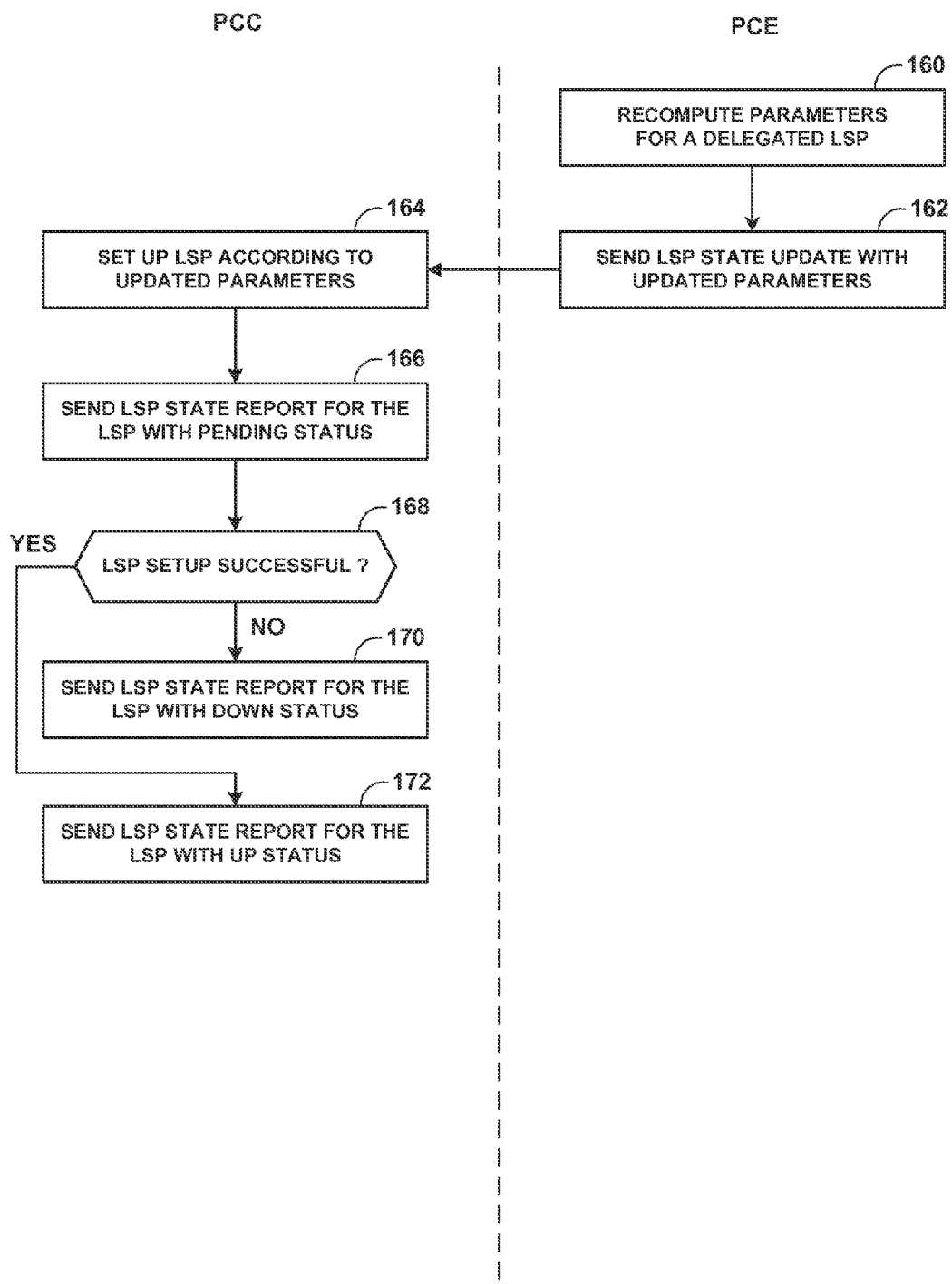
FIG. 4 is a flowchart illustrating example modes of operation for a PCC and a PCE using extended PCEP session techniques of this disclosure to actively modify LSP state in the network with the PCE.

FIG. 4 is a flowchart illustrating example modes of operation for a PCC and a PCE using extended PCEP session techniques of this disclosure to actively modify LSP state in the network with the PCE. Having successfully established extended PCEP sessions 12, PCE 6 continually receives LSP state information synchronized by PCCs 8 in response to network events that affect LSPs owned by routers 4. PCE 6 autonomously re-computes a path or path parameters for an LSP delegated to the PCE by PCC 8A (160). This optimization may be performed to improve network system 2 throughput or to promote fairness by adjusting resource allocation among traffic flows and requested demands, for example.

PCE 6 sends to PCC 8A an LSP update request, which may be included in a PCUpd message (162). A single PCUpd message may include one or more LSP update requests. The LSP update request includes a number of different objects that specify parameters in the form of constraints and attributes for an LSP path, described in further detail with respect to FIG. 8. The PCE 6 may also specify in the LSP state update request a request priority that corresponds to the urgency for the modification.

PCC 8A receives the LSP update request, tears down the target LSP, and directs router 4A to attempt to re-signal the target LSP according the specified, updated constraints and attributes received therein (164). By re-signaling the target LSP using MPLS-related protocols, such as RSVP-TE, router 4A may leverage protection advantages ingrained in these protocols, such as Fast ReRoute (FRR). To indicate that LSP setup is proceeding, PCC 8A sends an LSP state report that specifies a "pending" status for the LSP (166).

If the LSP setup is not successful due, for example, to insufficient resources in one of the label switching routers 4 along the computed path (NO branch of 168), PCC 8A sends to PCE 6 an LSP state report that specifies a "down" status for the LSP (170). The LSP state report may state the cause of the failed LSP setup. If the LSP setup is successful (YES branch of 168), PCC 8A sends to PCE 6 an LSP state report that specifies an "up" status for the LSP (172). In this way, PCC 8A continually provides any state changes to PCE 6 using LSP state reports to improve the visibility of PCE 6 for computation paths through network system 2. In some embodiments, PCC 8A sends any LSP state report to any PCE with which the PCC has established an extended PCEP session.

Figure 5:
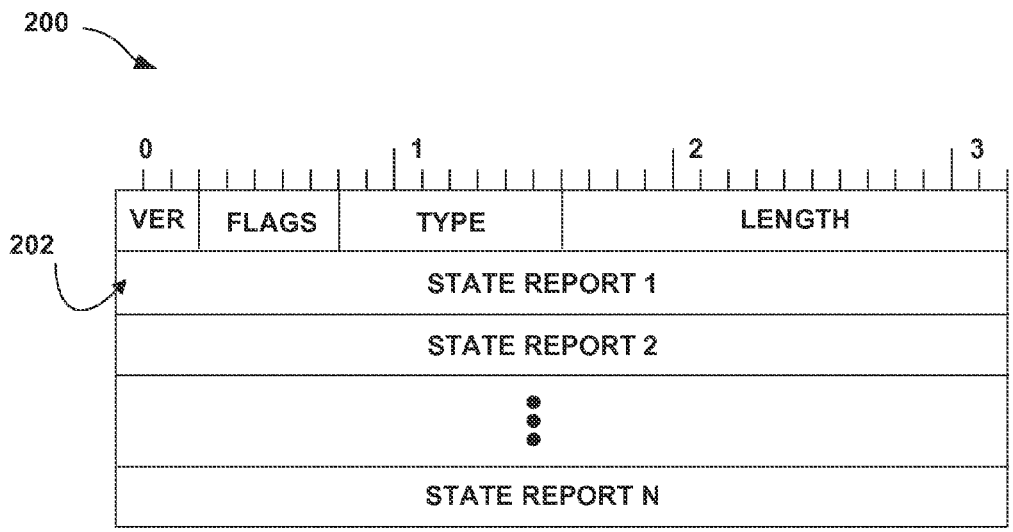
FIG. 5 is a block diagram illustrating an example format for a path computation LSP state report message that facilitates extended PCEP techniques described in this disclosure.

FIG. 5 is a block diagram illustrating an example format for a path computation LSP state report ("PCRpt") message that facilitates extended PCEP techniques described in this disclosure. A PCC may send a PCRpt in response to an LSP Update Request from a PCE, or asynchronously when the state of an LSP changes. PCRpt message 200 includes the common header for PCEP defined in RFC 5440. This common header specifies the PCEP version number ("VER"), currently defined common flags ("FLAGS"), the message type ("TYPE"), and the message length ("LENGTH") that specifies the total length of PCRpt message 200 in bytes, including the common header. The message type field of PCRpt message 200, declares to the recipient that the message is of type "PCRpt." The message type value may be "8" in some instances to indicate type "PCRpt."

PCRpt message 200 additionally includes one or more state reports, described hereinafter with respect to state report 202 (illustrated as "STATE REPORT 1"). State report 202 specifies an LSP object, described more fully with respect to FIG. 6. State report 202 optionally includes LSPA, BANDWIDTH, METRIC, and/or RRO objects defined in RFC 5440. The LSP attributes (LSPA) object specifies various TE LSP attributes. The BANDWIDTH object specifies a bandwidth for the TE LSP. The METRIC object may specify the metric that has been optimized for the TE LSP (e.g., an IGP metric, a TE metric, hop counts). The Reported Route Object (RRO) reports the route followed by the TE LSP.

Figure 6:
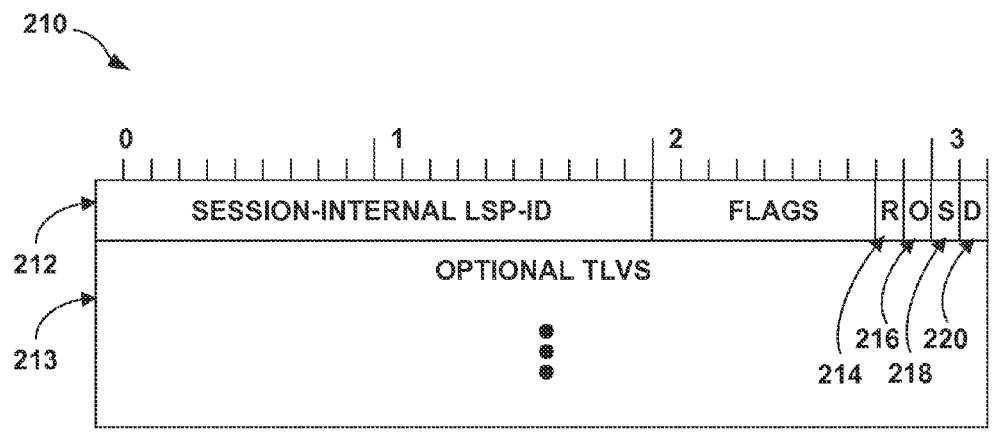
FIG. 6 is a block diagram illustrating an example format for an LSP object carried by LSP state report and LSP update request messages in a manner consistent with the described techniques.

FIG. 6 is a block diagram illustrating an example format for an LSP object carried by PCRpt and PCUpd messages in a manner consistent with the described techniques. LSP object 210 includes SESSION-INTERNAL LSP-ID field 212 that specifies an LSP identifier (LSP-ID) of the target LSP for the state report or update request that includes LSP object 210. SESSION-INTERNAL LSP-ID field 212 is a per-PCEP session identifier for the target LSP. That is, for each of its extended PCEP sessions, a PCC creates a unique LSP-ID for each LSP that it owns and maps the LSP-ID to the symbolic name for the corresponding, target LSP. As described more fully with respect to FIG. 7A, the PCC communicates the mapping in PCRpt messages to PCEs. Subsequent extended PCRpt and PCUpd messages may then address the target LSP by its LSP-ID, which is specifies by SESSION-INTERNAL LSP-ID field 212 of LSP object 210.

Delegate flag 220 indicates the delegation status for the target LSP. In a PCRpt message, a set delegate flag 220 (i.e., value='1') indicates that the sending PCC is delegating the LSP to the PCE. To maintain the delegation, the PCC must set delegate flag 220 on each PCRpt targeting the LSP for the duration of the delegation. A clear delegate flag 220 (i.e., value='0') revokes the delegation for the target LSP. The PCE must also maintain the delegation when sending PCUpd messages. To keep the delegation, the PCE must set delegate flag 220 on each PCUpd message targeting the LSP for the duration of the delegation. As with the PCC and PCRpt messages, the first PCUpd sent by the PCE to the PCC returns the delegation for the target LSP. A PCC may allocate delegations for LSPs to different PCEs with which it has established extended PCEP sessions.

Operational flag 216 indicates a reported or requested operational status of the target LSP. In PCRpt messages, a set operational flag 216 indicates the target LSP is operational, i.e., that is it either active or in the process of being signaled; a clear operational flag 216 indicates the target LSP is not operational, i.e., that it is torn down ("de-routed") and the router that includes the sending PCC is not attempting to re-signal it.

In PCUpd messages, a set operational flag 216 requests the PCC to make the target LSP operational, i.e., request the PCC to signal and bring up the LSP; a clear operational flag 216 requests the PCC to tear down the target LSP or otherwise make it non-operational. Because PCCs own LSP state, an operational flag 216 value does not override the configuration established in a PCC by an operator. For example, where an operator has configured a target LSP to be non-operational, setting operational flag 216 in an LSP object in update request of a PCUpd message does not automatically cause the receiving PCC to signal and/or bring up the target LSP.

A PCC sets synchronization done flag 218 on the LSP state report (e.g., LSP state report 202 described above with respect to FIG. 5) for the last LSP in the synchronized set during LSP state synchronization to a PCE. This indicates to the PCE that the PCC has finished the synchronization process. The PCC clears synchronization done flag 218 for every other LSP in the synchronized set during synchronization.

A PCC sets remove flag 214 in a state report of a PCRpt message to indicate to a receiving PCE that the target LSP has been removed from the PCC. In this circumstance, the PCE removes any LSP state information relating to the removed, target LSP.

LSP object 210 may optionally include one or more optional TLVs 213 that further describe states and operations for a target LSP. Examples of optional TLVs 213 are described more fully with respect to FIGS. 7A-7C.

Figure 7A:
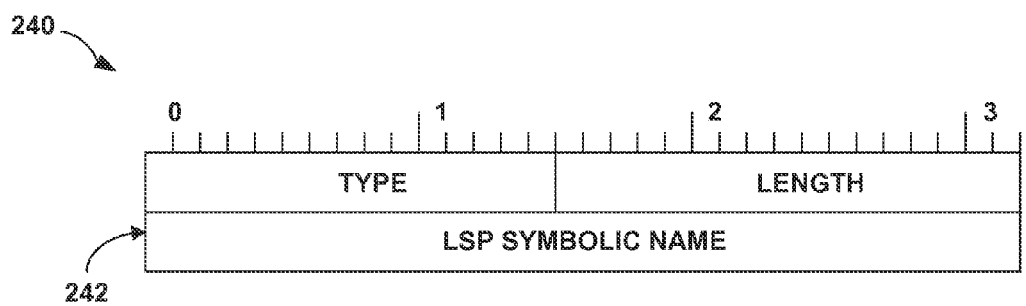
FIGS. 7A-7C are block diagrams illustrating example type-length-value objects (TLVs) that may be included within an LSP object carried by LSP state report and LSP update request messages in a manner consistent with the described techniques.
Figure 7B:
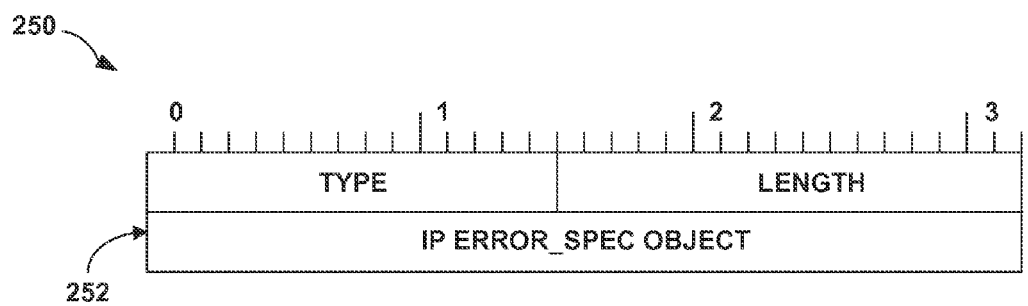
Figure 7C:
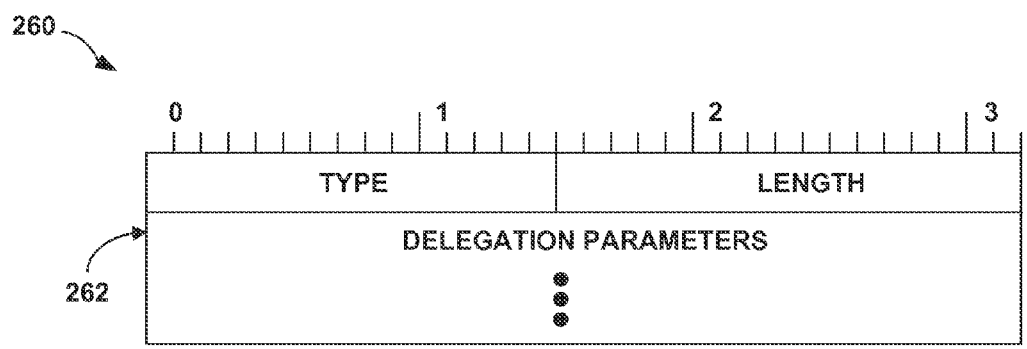

FIGS. 7A-7C are block diagrams illustrating example TLVs that may be included within an LSP object carried by PCRpt and PCUpd messages in a manner consistent with the described techniques. FIG. 7A illustrates an example LSP symbolic name TLV 242 that allows a PCC to communicate a LSP-ID to LSP symbolic name mapping to a PCE using an extended PCEP session. Each LSP in a PCC has a symbolic name that is unique within the PCC and remains constant throughout the lifetime of the LSP, i.e., across extended PCEP sessions and in some instances across PCC restarts. An LSP symbolic name may be specified by a network operator using, e.g., a configuration interface to the PCC that owns the LSP, or an LSP symbolic name may be generated by the PCC.

LSP symbolic name TLV 242 includes TYPE and LENGTH fields and also LSP symbolic name field 242 to specify the value of the LSP symbolic name for the targeted LSP. The LENGTH field may be variable to account for variable-length LSP symbolic names. A PCC includes an instance of LSP symbolic name TLV in a first PCRpt message from the PCC to the PCE reporting state information for the LSP. The first PCRpt message for an LSP from a PCC to a PCE in an extended PCEP session may occur during state synchronization or upon the addition of the LSP to the PCC by, e.g., a network operator or other administrative entity.

FIG. 7B illustrates an example error specification TLV 250 that a PCC may use to specify reasons that the target LSP in a state report in not operational, i.e., has a clear operational flag for the LSP object. Error specification TLV 250 includes TYPE and LENGTH fields and also LSP symbolic name field 252 to specify the value of an IP ERROR_SPEC object, for either IPv4 or IPv6. The ERROR_SPEC object and allowable error codes are defined in RFC 5440.

FIG. 7C illustrates an example delegation parameter TLV 260 that may be included in a state report sent from a PCC to a PCE. Delegation parameter TLV 260 includes TYPE and LENGTH fields and also delegation parameters field 262 to specify delegation parameters 262, such as sub-delegation permissions and authentication parameters. Delegation parameters may be carried by multiple different instances of delegation parameter TLV 26.

Figure 8:
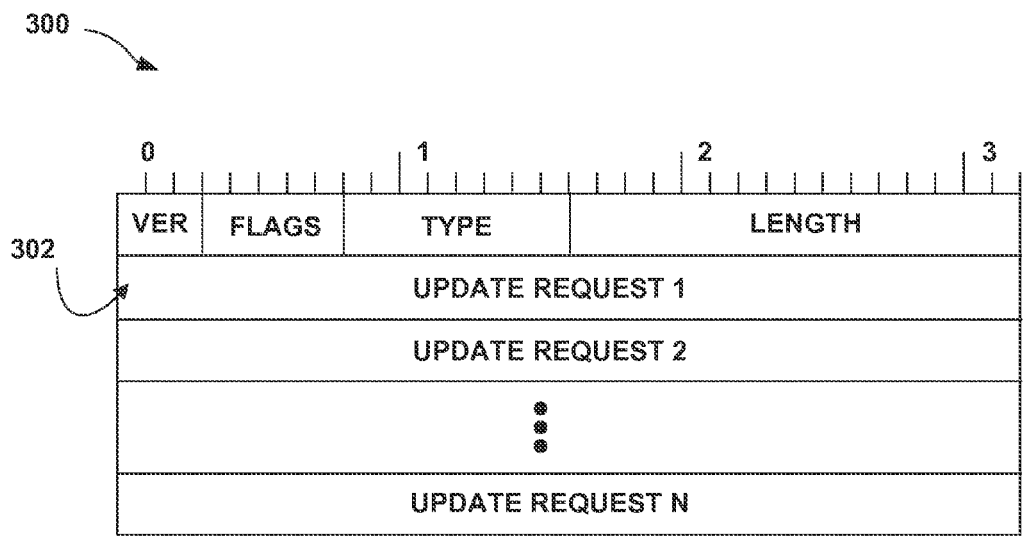
FIG. 8 is a block diagram illustrating an example format for a path computation LSP update request message that facilitates extended PCEP techniques described in this disclosure.

FIG. 8 is a block diagram illustrating an example format for a path computation LSP update request ("PCUpd") message that facilitates extended PCEP techniques described in this disclosure. A PCE may send a PCUpd message to a PCC to update parameters of one or more delegated LSPs. Among other things, this enables the PCE to direct the timing of LSP state modifications, including modification to LSP status (e.g., up/down). PCUpd message 300 includes the common header described above with respect to FIG. 5 in the context of PCRpt message 200. The message type value for the TYPE field of instances of PCUpd message 30 may be "9" in some instances to indicate type "PCUpd."

PCUpd message 300 includes one or more update requests, described hereinafter with respect to update request 302 (illustrated as "UPDATE REQUEST 1"). Update request 302 specifies an LSP object for the targeted LSP. LSP objects are described above with respect to FIG. 6. If an LSP object is missing from update request 302, the receiving PCC returns an error message to the sending PCE.

Update request 202 optionally includes an attribute list and/or a path list for the targeted LSP. An attribute list may optionally include any one or more of the LSPA, BANDWIDTH, METRIC, ERO, IRO objects defined in RFC 5440. The METRIC object may specify the cost for a computed path for the targeted LSP. The attribute list may include multiple METRIC objects. The optional Include Route Object (IRO) specifies that the computed path must traverse a specified set of network elements.

Update request 202 optionally includes a path list consisting of a set of one or more paths computed by the PCE for the targeted LSP. Each path in set of computed paths is specified using an ERO and an attribute list for the path.

Update request 202 includes all required LSP parameters for a given signaling operation. A PCC, upon receiving an instance of update request 202, tears down (if necessary) the targeted LSP and then re-signals the target LSP according to parameters provided in the update request. The PCC may use make-before-break in the signaling operation, however. As described above, the PCC responds to update request 202 with one or more LSP state report messages to report LSP setup progress. If the rate of PCUpd messages sent to a PCC for the same target LSP exceeds the rate at which the PCC can signal LSPs into the network, the PCC may perform state compression and only re-signal the last modification received from the PCE.

Figure 9:
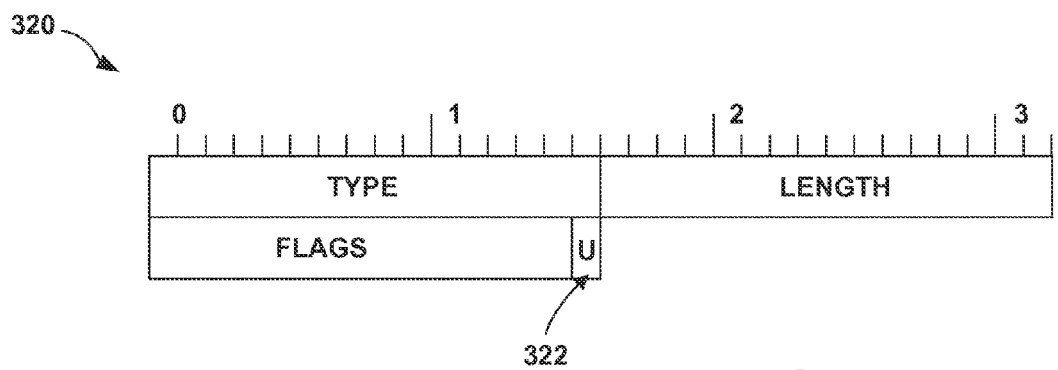
FIG. 9 is a block diagram illustrating an example format for a stateful PCE capability TLV that accords with the extended PCEP techniques described herein.

FIG. 9 is a block diagram illustrating an example format for a stateful PCE capability TLV that accords with the extended PCEP techniques described in this disclosure. Stateful PCE capability TLV 320 may be included in extended PCEP initialization messages, such as the OPEN message that defined in RFC 5440 and incorporated within extended PCEP together with other PCEP messages. The FLAGS field (the value field of the TLV) includes LSP update capability flag 322. When set by a PCC, LSP update capability flag 322 indicates the PCC allows modification of LSP parameters for delegated LSPs. When set by a PCE, LSP update capability flag 322 indicates the PCE is capable of updating LSP parameters for delegated LSPs. If both a PCE and PCC communicate a set LSP update capability flag 322 during PCEP session initialization, PCE may send PCUpd messages to the PCC to actively modify parameters of targeted LSPs.

Figure 10:
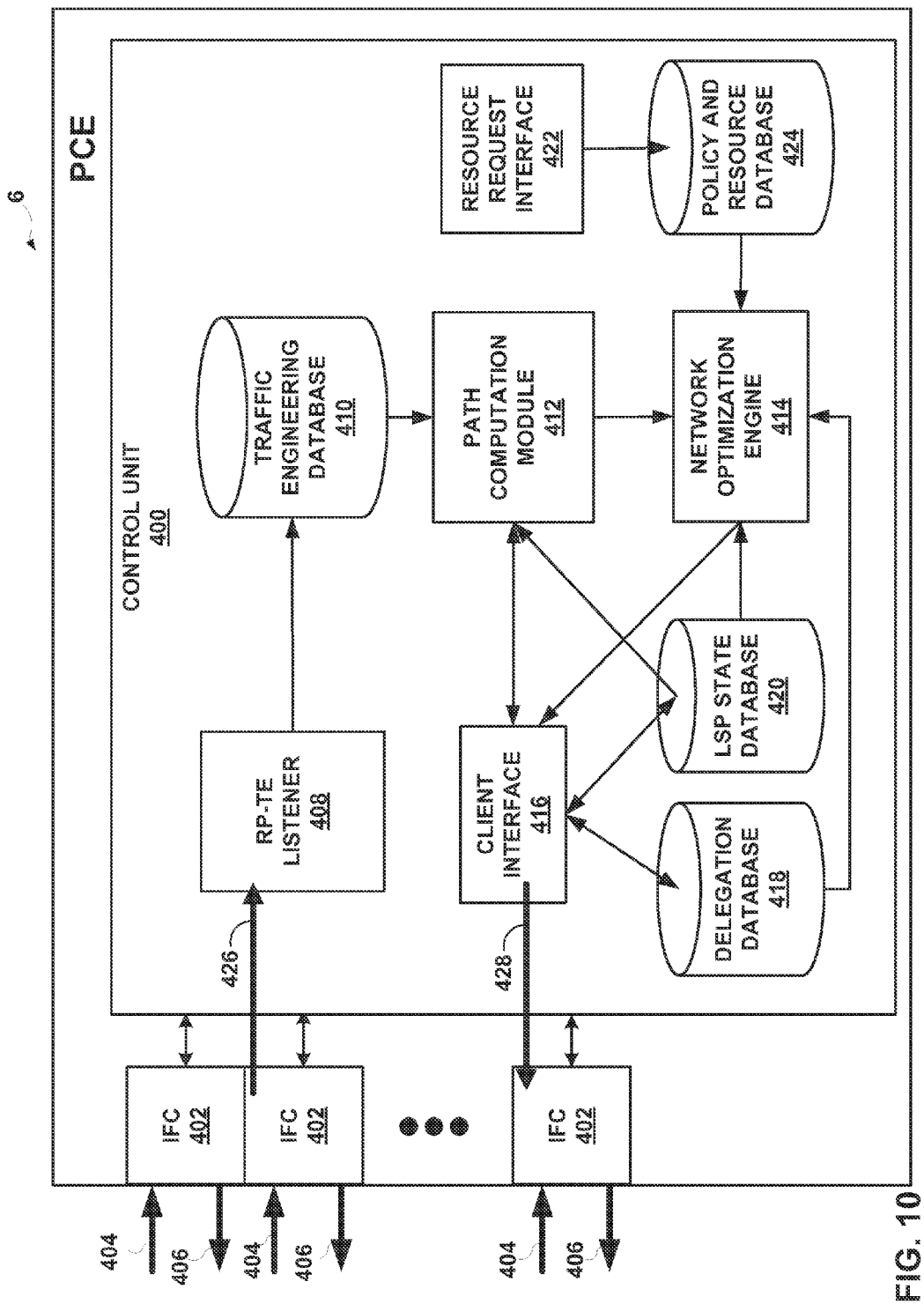
FIG. 10 is a block diagram illustrating an example instance of a stateful path computation element that establishes and uses extended PCEP sessions according to techniques described in this disclosure.

FIG. 10 is a block diagram illustrating an example instance of a stateful path computation element that establishes and uses extended PCEP sessions according to techniques described in this disclosure. Stateful PCE 6, in this example, includes control unit 400 coupled to interface cards 402 ("IFCs 402") for receiving packets via input links 404 ("input links 44") and sending packets via output links 406 ("output links 406").

Control unit 400 may comprise one or more processors (not shown in FIG. 10) that execute software instructions, such as those used to define a software or computer program, stored to a computer-readable storage medium, such as non-transitory computer-readable mediums including a storage device (e.g., a disk drive, or an optical drive) or a memory (such as Flash memory, random access memory or RAM) or any other type of volatile or non-volatile memory, that stores instructions to cause the one or more processors to perform the techniques described herein. Alternatively or additionally, control unit 400 may comprise dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein.

Routing protocol with traffic engineering extensions listener 408 ("RP-TE listener 408") is a process of control unit 408 that executes one or more routing protocols extended to advertise and receive traffic engineering (TE) information. RP-TE listener 408 may in some instances be a passive listener and eschew routing protocol advertisements. RP-TE 408 may, for example, execute Intermediate System-to-Intermediate System with TE extensions (IS-IS-TE) or Open Shortest Path First with TE extensions (OSPF-TE). In some instances, RP-TE listener 408 executes Border Gateway Protocol to receive advertised TE information for inter-AS and other out-of-network links. Additional details regarding executing BGP to receive TE info are found in U.S. patent application Ser. No. 13/110,987, filed May 19, 2011 and entitled "DYNAMICALLY GENERATING APPLICATION-LAYER TRAFFIC OPTIMIZATION PROTOCOL MAPS," which is incorporated herein by reference in its entirety.

Traffic engineering information received by RP-TE listener 408 includes topology information for the path computation domain served by PCE 6. Such TE information includes one or more of the link state, administrative attributes, and metrics such as bandwidth available for use at various LSP priority levels of links connecting routers of the domain. RP-TE listener 408 stores TE information in traffic engineering database (TED) 410, which is stored by a computer-readable storage medium for use in path computation.

Client interface 416 of control unit 400 implements PCE communication protocol (PCEP) extensions to receive and send extended PCEP messages described in this disclosure. That is, client interface 416 establishes extended PCEP sessions with one or more path computation clients (PCCs) operating on MPLS-enabled routers in the network. Via the extended PCEP sessions, client interface 416 receives LSP state reports 426 that include up-to-date LSP state for LSPs owned by the corresponding clients, which client interface 416 stores to LSP state database 420. LSP state reports may be included in PCRpt messages. LSP state, received by client interface 416 and stored to LSP state database 420, for an LSP may include, for example, the LSP status (e.g., up/down), symbolic name for inter-PCEP session persistence, LSP attributes such as setup priority and hold priority, number of hops, the reserved bandwidth, a metric that has been optimized for the LSP (e.g., an IGP metric, a TE metric, or hop counts), and a path followed by the LSP. In this way, client interface 416 maintains strict synchronization between PCE 6 and the set of computed paths and reserved resources in use in the network in addition to TED 410 having synchronized TE information received by operation of RP-TE listener 408.

In addition, where PCE 6 is an active stateful PCE, client interface 416 may advertise PCE 6 as having an LSP update capability, as described above with respect to FIG. 9. As a result, LSP state reports received by client interface 416 may in some case include a delegation that provides access rights to PCE 6 to modify parameters of the target LSP. In some instances, the delegation may specify the particular parameters of the target LSP that are exposed for modification. Client interface 416 stores such delegation information to delegation database 418, which may associate the delegation information with LSP identifiers that also identify LSPs in LSP state database 420. Client interface 416 also implements functionality for the operation of conventional PCEP, such as path computation request/reply messages.

Resource request interface 422 of control unit 400 provides an interface by which applications and/or operators may request TE LSPs having particular characteristics, such as source/destination and guaranteed bandwidth. Applications and operators may also use resource request interface 422 to inspect LSP state information and modify parameters of LSPs identifiable by their respective symbolic names. For example, PCE 6 may receive via resource request interface 422 a resource request message from an application that identifies an LSP by its symbolic name. In response, resource request interface 422 returns a digest of LSP state information for the identified LSP to the application. Resource request interface 422 stores resource requirements corresponding to the requests in policy and resource database 424, which may also store policies that determine the operation of PCE 6, in particular of network optimization engine 414, upon the occurrence of specified conditions.

Network optimization engine 414 executing on control unit 400 uses TE information of TED 410, LSP state information stored to LSP state database 420, and/or delegation information stored to delegation database 418 to identify permissible modifications to existing, delegated LSPs that further normative goals of the network operator, which may be expressed in policy and resource database 424. Such goals may include maximizing total throughput and/or fostering bandwidth allocation fairness for requested resources, for instance. Network optimization engine 414 may invoke path computation module 412 of control unit, executes constrained SPF (CSPF) using supplied constraints to determine a set of paths from a source to a destination that satisfy the constraints. LSP state information stored to LSP state database 420 may supply constraints and link metrics to path computation module 412 for both passive stateful and active stateful instances of PCE 6.

Upon determining modifications to parameters of one or more LSPs delegated to PCE 6 by a PCC, network optimization engine 414 directs client interface 416 to send LSP update requests 428 that specify the LSP parameter modifications for each of the LSPs. LSP update requests 428 may be included in PCUpd messages, as described in detail with respect to FIG. 8.

Figure 11:
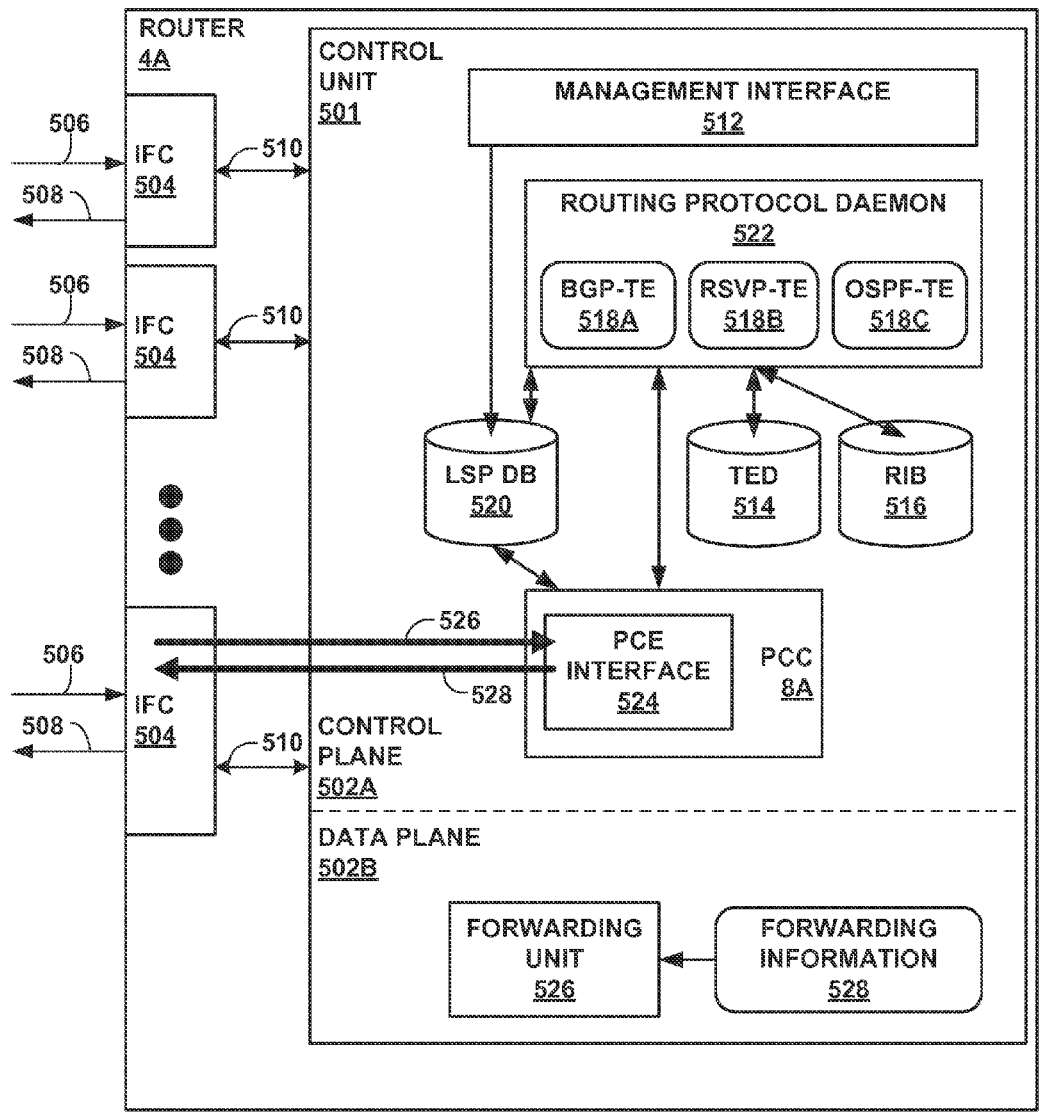
FIG. 11 is a block diagram illustrating an example router that establishes and uses extended path computation element communication protocol sessions to a path computation element in accordance with techniques described herein.

FIG. 11 is a block diagram illustrating an example router that establishes and uses extended PCEP sessions to a path computation element in accordance with techniques described in this disclosure. For purposes of illustration, router 4A may be described below within the context of an exemplary network system 2 of FIG. 1 and may represent any one of routers 4. Moreover, while described with respect to a particular network device, e.g., a router, the techniques may be implemented by any network device that executes MPLS/GMPLS to establish and operate LSPs. The techniques should therefore not be limited to the exemplary embodiments described in this disclosure.

Router 4A includes a control unit 501 and interface cards (IFCs) 504 coupled to control unit 501 via internal links 510. Control unit 501 may comprise one or more processors (not shown in FIG. 11) that execute software instructions, such as those used to define a software or computer program, stored to a computer-readable storage medium (again, not shown in FIG. 11), such as non-transitory computer-readable mediums including a storage device (e.g., a disk drive, or an optical drive) or a memory (such as Flash memory, random access memory or RAM) or any other type of volatile or non-volatile memory, that stores instructions to cause the one or more processors to perform the techniques described herein. Alternatively or additionally, control unit 501 may comprise dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein.

In this example, control unit 501 is divided into two logical or physical "planes" to include a first control or routing plane 502A ("control plane 502A") and a second data or forwarding plane 502B ("data plane 502B"). That is, control unit 501 implements two separate functionalities, e.g., the routing/control and forwarding/data functionalities, either logically, e.g., as separate software instances executing on the same set of hardware components, or physically, e.g., as separate physical dedicated hardware components that either statically implement the functionality in hardware or dynamically execute software or a computer program to implement the functionality.

Control plane 502A of control unit 501 executes the routing functionality of router 4A. In this respect, control plane 502A represents hardware or a combination of hardware and software of control unit 501 that implements, in routing protocol daemon (RPD) 522, protocols 518 by which routing information stored in routing information base 516 ("RIB 516") may be determined. RIB 516 may include information defining a topology of a network, such as network 2 of FIG. 1. RPD 522 may resolve the topology defined by routing information in RIB 516 to select or determine one or more routes through the network. RPD 522 may then update data plane 502B with representations of these routes, where data plane 502B maintains these representations as forwarding information 528.

Routing protocols of protocols 518 executed by RPD 522 include, in this example, Border Gateway Protocol with Traffic Engineering extensions (BGP-TE) 518A and Open Shortest Path First with Traffic Engineering extensions (OSPF-TE) 518C. RPD 522 executes these protocols to advertise and receive routing and traffic engineering information from other routers, including autonomous system border routers of external ASes and routers within a routing domain in which router 4A participates. Various other examples may implement other link-state or vector-distance protocols to exchange traffic engineering with other routers. RPD 522 stores received traffic engineering information in traffic engineering database 514 (illustrated as "TED 514"), which is stored by a computer-readable storage medium. TED 514 may subsume RIB 516 in some instances to store all traffic engineering information in a single data structure. TED 514 may store, for example, one or more of the link state, administrative attributes, and metrics such as bandwidth available for use at various LSP priority levels of links connecting router 4A to other routers of an MPLS domain.

Forwarding or data plane 502B represents hardware or a combination of hardware and software of control unit 501 that forwards network traffic in accordance with forwarding information 528 that includes network destinations of output links 508 as well as MPLS forwarding information such as LSP label mappings that associate outbound labels and interfaces to inbound labels received on incoming traffic. Data plane 502B includes a forwarding unit 526 that provides high-speed forwarding of network traffic received by interface cards 504 via inbound links 506 to outbound links 508. Forwarding unit 526 may represent a packet forwarding engine (PFE). Further details of one example embodiment of a router can be found in U.S. patent application Ser. No. 12/182,619, filed Jul. 30, 2008, and entitled "STREAMLINED PACKET FORWARDING USING DYNAMIC FILTERS FOR ROUTING AND SECURITY IN A SHARED FORWARDING PLANE," which is incorporated herein by reference.

Control plane 32A further includes management interface 512 by which a network management system or in some instances an administrator using a command line or graphical user interface configures label switched paths described in LSP database 520 (illustrated as "LSP DB 520"). LSP database 520 includes LSP configuration data, for example, an LSP destination, setup/hold priorities, path (e.g., an RRO), metrics, and other LSP attributes such as those described herein. LSP database 520 also includes, in conformity to the techniques of this disclosure, information designating zero or more attributes of each configured LSP as delegable parameters that may be set/modified by a PCE using extended PCEP to modify the operation of the LSP when set up in the network. LSP attributes may be divided into three categories: (1) non-delegable parameters that RPD 522 applies immediately via RSVP-TE 518B and are neither re-signalled nor overridden by a PCE, (2) delegable parameters that RPD 522 applies when the LSP is re-signaled due, e.g., to LSP failure, and (3) delegable parameters that may be overridden by a PCE and trigger re-signaling by RPD 522. All delegable LSP parameters may include a configured default value that RPD 522 applies when, for example, a PCEP session terminates, the PCE otherwise becomes unavailable, or the PCE returns a delegation.

RPD 522 sets up LSP described in LSP database 520 by executing a resource reservation protocol, which in this instance is Resource Reservation Protocol with Traffic Engineering extensions (RSVP-TE) 518B, that signals other routers in the network to reserve resources and provide MPLS forwarding information to RPD 522 for use in forwarding MPLS packets. Various instances of router 4A may also, or alternatively, use standard RSVP (i.e., without traffic engineering extensions) or Label Distribution Protocol (LDP) to signal LSPs. In addition, RPD 522 executes protocols 518 to receive traffic engineering information that affects the state of LSPs, such as failed links and preempted resources that may result in a down state for LSPs. RPD 522 may associate such LSP state information with corresponding LSPs in LSP database 520 and may further directs PCC 8A to send one or more LSP state reports to a PCE in response, as described in further detail below.

In accordance with techniques of this disclosure, path computation client (PCC) module 8A of control plane 502A mediates communication between RPD 522 and a path computation element. PCC 8A includes PCE (PCE) interface 524 that implements PCE communication protocol (PCEP) extensions to receive and send extended PCEP messages described in this disclosure. PCE interface 524 also implements functionality for the operation of conventional PCEP, such as path computation request/reply messages.

PCE interface 524 establishes extended PCEP sessions with one or more PCEs and sends, via the extended PCEP sessions, LSP state reports 528 that include up-to-date LSP state for LSPs described in LSP state information. LSP state reports may be included in PCRpt messages. In this way, PCC 8A maintains strict LSP state synchronization between router 4A and the PCEs.

In addition, PCE interface 524 may advertise router 4A as allowing modification of delegable parameters, as described above with respect to FIG. 9. As a result, LSP state reports sent by PCE interface 524 may in some case include a delegation that provides access rights to a PCE to modify parameters of the target LSP. In some instances, the delegation may specify the particular parameters of the target LSP that are exposed for modification. PCE interface 524 may, after delegating LSPs, receive LSP update requests 528 that specify LSP parameter modifications for one or more of the LSPs. LSP update requests may be included in PCUpd messages, as described in detail with respect to FIG. 8. PCC 8A, in response, notifies RPD 522 of new parameters for target LSPs identified in LSP update requests 528. RPD 522 may re-signal the target LSPs, in turn, and as new LSPs are established, switch traffic over to the new LSPs and send a notification to PCC 8A that the new LSPs have been successfully signaled. PCE interface 524 provides this updated LSP state in LSP status reports to one or more PCEs with router 4A has extended PCEP sessions. Router 4A thus extends existing RSVP-TE functionality with an extended PCEP protocol that enables a PCE to set parameters for a TE LSP configured within the router.

The techniques described herein may be implemented in hardware, software, firmware, or any combination thereof. Various features described as modules, engines, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

Various embodiments have been described. These and other embodiments are within the scope of the following examples.

What is claimed is:

1. A method comprising:
  establishing an extended path computation element communication protocol (PCEP) session with a stateful path computation element (PCE) to a path computation client (PCC) of a network router of a packet-switched network;
  receiving, with the stateful PCE, label switched path (LSP) state information that specifies a current state of an existing LSP previously signaled by the PCC; and
  sending, from the stateful PCE to the PCC using the extended PCEP session, an LSP update request that includes one or more updated parameters for the existing LSP and directs the PCC to re-signal the existing LSP according to the updated parameters.

2. The method of claim 1,
  wherein the LSP state information includes one or more of a status, a setup priority, a hold priority, a number of hops, a reserved bandwidth, a metric, or a path for the existing LSP.

3. The method of claim 1, further comprising:
receiving, with the stateful PCE in the extended PCEP session, an association between an LSP identifier that identifies the existing LSP in extended PCEP messages for the extended PCEP session and a symbolic LSP name that is unique within the PCC for the existing LSP; and
associating the LSP state information received by the stateful PCE with the LSP identifier and the symbolic LSP name.

4. The method of claim 3, further comprising:
receiving, with the stateful PCE, a resource request message that includes the symbolic LSP name;
identifying, with the stateful PCE, LSP state information for the existing LSP using the symbolic LSP name; and
providing the LSP state information in response to the resource request message.

5. The method of claim 1, wherein the stateful PCE sends the LSP update request only when the stateful PCE is delegated control of the existing LSP from the PCC.

6. The method of claim 1, further comprising:
receiving, by the stateful PCE, an LSP state report message in the extended PCEP session that delegates control of the existing LSP from the PCC to the stateful PCE.

7. The method of claim 6, further comprising:
sending, from the stateful PCE to the PCC, an LSP update request message in the extended PCEP session that returns the delegated control of the existing LSP to the PCC.

8. The method of claim 1, wherein the updated parameters for the existing LSP include one or more of an LSP status and an LSP reserved bandwidth.

9. The method of claim 1, wherein the existing LSP is a first LSP, the method further comprising:
receiving, with the stateful PCE, LSP state information for a second LSP previously signaled by the PCC;
determining, according to a network policy stored by the stateful PCE, an optimal ordering of setting up the first and second LSPs;
sending the LSP update request in the extended PCEP session to direct the PCC to re-signal the first LSP according to the optimal ordering;
according to the determined ordering, sending a subsequent LSP update request in the extended PCEP session to direct the PCC to re-signal the second LSP according to the optimal ordering after setting up the first LSP.

10. The method of claim 9, wherein the network policy includes one of a total throughput and bandwidth allocation fairness.

11. The method of claim 1, further comprising:
executing a routing protocol to receive traffic engineering information with the stateful PCE from routers of the network; and
determining the updated parameters for the existing LSP using the traffic engineering information.

12. The method of claim 1, wherein the LSP update request specifies a priority that directs the PCC to prioritize the LSP update request among a set of received LSP update requests.

13. The method of claim 1, further comprising:
receiving, with the stateful PCE, an LSP state report message subsequent to sending the LSP update request indicating whether the PCC successfully re-signaled the existing LSP according to the updated parameters.

14. The method of claim 1, further comprising:
receiving, with the stateful PCE, an initialization message from the PCC indicating the PCC allows modification of parameters for the existing LSP.

15. A path computation element (PCE) comprising:
a control unit having one or more processors;
a client interface of the control unit that establishes an extended path computation element communication protocol (PCEP) session to a path computation client (PCC) of a network router of a packet-switched network; and
a label switched path (LSP) state database that stores LSP state information for one or more LSPs owned by the PCC,
wherein the client interface receives LSP state information that specifies a current state of an existing LSP previously signaled by the PCC and stores the LSP state information to the LSP state database, and
wherein the client interface sends, to the PCC using the extended PCEP session, an LSP update request that includes one or more updated parameters for the existing LSP and directs the PCC to re-signal the existing LSP according to the updated parameters.

16. The PCE of claim 15, further comprising:
a delegation database that specifies LSPs in the LSP state information database that are controlled by the PCE,
wherein the client interface receives an LSP state report message in the extended PCEP session that delegates control of the existing LSP from the PCC to the PCE and stores the delegation to the delegation database.

17. The PCE of claim 15, further comprising:
a traffic engineering database (TED) that stores traffic engineering information for the network; and
a routing protocol with traffic engineering extensions listener of the control unit that executes one or more routing protocols to receive traffic engineering information and stores received traffic engineering information to the TED.

18. The PCE of claim 15, further comprising:
a network optimization engine; and
a policy and resource database that stores a network policy,
wherein the existing LSP is a first LSP,
wherein the client interfaces receives LSP state information for a second LSP previously signaled by the PCC,
wherein the network optimization engine determines, according to the network policy, an optimal ordering of setting up the first and second LSPs,
wherein the client interface sends the LSP update request in the extended PCEP session to direct the PCC to re-signal the first LSP according to the optimal ordering, and
wherein, according to the determined ordering, the client interface sends a subsequent LSP update request in the extended PCEP session to the direct to PCC to re-signal the second LSP according to the optimal ordering after setting up the first LSP.

19. A method comprising:
establishing an extended path computation element communication protocol (PCEP) session, with a path computation client (PCC) of a network router of a packet-switched network, to a stateful path computation element (PCE);
synchronizing, with the PCC, label switched path (LSP) state information that specifies a current state of an existing LSP previously signaled by the PCC to the stateful PCE using the extended PCEP session; and
receiving, with the PCC from the stateful PCE using the extended PCEP session, an LSP update request that includes one or more updated parameters for the existing LSP and directs the PCC to re-signal the existing LSP according to the updated parameters.

20. The method of claim 19, further comprising:
re-signaling the existing LSP with the PCC in response to receiving the LSP update request.

21. The method of claim 19, further comprising:
receiving, with the PCC, a subsequent LSP update request from the stateful PCE, wherein the subsequent LSP update request includes one or more updated parameters for the existing LSP; and
re-signaling, with the PCC, the existing LSP using the updated parameters included in the subsequent LSP update request without re-signaling the existing LSP using the updated parameters included in the LSP update request.

22. The method of claim 19,
wherein the LSP state information includes one or more of a status, a setup priority, a hold priority, a number of hops, a reserved bandwidth, a metric, and a path for the existing LSP.

23. The method of claim 19, further comprising:
generating, with the PCC, an LSP identifier that identifies the existing LSP in extended PCEP messages for the extended PCEP session; and
sending an association between the LSP identifier and a symbolic LSP name that is unique within the PCC for the existing LSP to the stateful PCE.

24. The method of claim 23, further comprising:
synchronizing the LSP state information using an LSP state report message that includes the LSP identifier.

25. The method of claim 19, further comprising:
sending an LSP state report message in the extended PCEP session to the stateful PCE, wherein the LSP state report message delegates control of the existing LSP to the stateful PCE.

26. The method of claim 25, further comprising:
receiving a subsequent LSP state report message in the extended PCEP session from the stateful PCE, wherein the subsequent LSP state report message returns control of the existing LSP to the PCC.

27. The method of claim 25, further comprising:
sending a subsequent LSP state report message in the extended PCEP session to the stateful PCE, wherein the subsequent LSP state report message revokes control of the existing LSP from the PCE.

28. The method of claim 19, further comprising:
re-signaling the existing LSP with the PCC in response to receiving the LSP update request only when the PCC has delegated control of the existing LSP to the stateful PCE.

29. The method of claim 19, further comprising:
synchronizing, with the PCC, LSP state information that specifies a current state of all LSPs of the PCC to the stateful PCE using the extended PCEP session.

30. The method of claim 19, wherein the PCC does not request path computation from the stateful PCE.

31. A router comprising:
a control unit having one or more processors;
a path computation client of the control unit having a path computation element (PCE) interface that establishes an extended path computation element communication protocol (PCEP) session to a stateful PCE; and
a label switched path (LSP) database that includes configuration data for one or more LSPs configured in the router and further includes LSP state information specifying a current state of all LSPs of the router,
wherein the PCE interface synchronizes the LSP state information to the stateful PCE using the extended PCEP session,
wherein the PCE interface receives, using the extended PCEP session, an LSP update request from the stateful PCE that includes one or more updated parameters for an existing LSP of the LSPs and directs the router to re-signal the existing LSP according to the updated parameters.

32. The router of claim 31, further comprising:
a routing protocol daemon that re-signals the existing LSP with the updated parameters.

33. The router of claim 31, wherein the LSP state information includes one or more of a status, a setup priority, a hold priority, a number of hops, a reserved bandwidth, a metric, and a path for the existing LSP.

34. The router of claim 31,
wherein the PCC generates an LSP identifier that identifies the existing LSP in extended PCEP messages for the extended PCEP session, and
wherein the PCE interface sends an association between the LSP identifier and a symbolic LSP name that is unique within the router for the existing LSP to the stateful PCE.

35. The router of claim 31,
wherein the configuration data specifies one or more delegable parameters for the existing LSP, and
wherein the PCE interface sends an LSP state report message in the extended PCEP session to the stateful PCE, wherein the LSP state report message delegates control of the delegable parameters for the existing LSP to the stateful PCE.

36. The router of claim 31, further comprising:
a routing protocol daemon,
wherein the configuration data specifies default parameters for the existing LSP, and
wherein the router directs the routing protocol daemon to re-signal the existing LSP using the default parameters when the extended PCEP session terminates.

37. The router of claim 31, further comprising:
a routing protocol daemon,
wherein the configuration data specifies default parameters for the existing LSP,
wherein the PCE interface receives an LSP update request message returning a delegation for the existing LSP, and
wherein the PCC, in response to the LSP update request message, directs the routing protocol daemon to re-signal the existing LSP using the default parameters.

* * * * *